(12) United States Patent
Wallace et al.

(10) Patent No.: US 8,256,607 B2
(45) Date of Patent: Sep. 4, 2012

(54) SENSOR SYSTEM FOR A CONVEYOR BELT

(75) Inventors: Jack Bruce Wallace, Powell, OH (US); Michael John Alport, Durban (ZA); Jacques Frederick Basson, Durban (ZA)

(73) Assignees: Veyanee Technologies Inc., Fairlawn, OH (US); Advanced Imaging Technologies Ltd., Durban (ZA)

( * ) Notice: Subject to any disclaimer, the term of this patent is extended or adjusted under 35 U.S.C. 154(b) by 55 days.

(21) Appl. No.: 12/902,388

(22) Filed: Oct. 12, 2010

(65) Prior Publication Data
US 2011/0024269 A1    Feb. 3, 2011

Related U.S. Application Data

(63) Continuation of application No. 12/185,400, filed on Aug. 4, 2008, now Pat. No. 7,810,634.

(51) Int. Cl.
*B65G 43/00*    (2006.01)

(52) U.S. Cl. .................................. 198/810.02

(58) Field of Classification Search ............. 198/810.02
See application file for complete search history.

(56) References Cited

U.S. PATENT DOCUMENTS

| | | | |
|---|---|---|---|
| 3,602,360 A | 8/1971 | Halbach et al. | 198/810.02 |
| 3,636,436 A | 1/1972 | Kurauchi et al. | 324/226 |
| 3,651,506 A | 3/1972 | Olaf et al. | 340/676 |
| 3,656,137 A | 4/1972 | Ratz | 340/676 |
| 3,731,113 A | 5/1973 | Lowe et al. | 198/810.02 |
| 3,742,477 A | 6/1973 | Enabnit | 193/810.02 |
| 3,792,459 A | 2/1974 | Snyder | 198/810.02 |
| 3,831,161 A | 8/1974 | Enabnit | 340/507 |
| 3,834,518 A | 9/1974 | Specht et al. | 198/810.02 |
| 3,899,071 A | 8/1975 | Duffy | 198/810.02 |
| 3,922,661 A | 11/1975 | Enabnit et al. | 198/810.02 |
| 4,017,826 A | 4/1977 | Enabnit | 340/448 |
| 4,020,945 A | 5/1977 | Takeno et al. | 198/310.02 |
| 4,087,800 A | 5/1978 | Lee | 40/676 |
| 4,228,513 A | 10/1980 | Doljack | 198/810.02 |
| 4,229,735 A | 10/1980 | Houck | 340/676 |
| 4,436,198 A | 3/1984 | Houck et al. | 198/810.02 |
| 4,437,563 A | 3/1984 | Oriol | 198/810.02 |
| 4,439,731 A | 3/1984 | Harrison | 324/239 |
| 4,447,807 A | 5/1984 | Klein et al. | 198/810.02 |

(Continued)

FOREIGN PATENT DOCUMENTS
DE    19525326 C1    10/1996

*Primary Examiner* — James R Bidwell
(74) *Attorney, Agent, or Firm* — Alvin T. Rockhill; Kathleen K. Bowen (57) ABSTRACT

A monitoring system is provided for a moving conveyor belt having a plurality of embedded reinforcing cords and identification tags. A tag reader detects and identifies the identification tags passing by the tag reader while a belt monitor scans the cords to detect a plurality of magnetic reference points and a damage event of at least one cord. A control unit in communication with the belt monitor and the tag reader analyzes the belt monitor to identify the plurality of magnetic reference points and the damage event. The control unit also acquires a belt location on the moving conveyor belt from a belt map based on the detected and identified identification tag and a magnetic reference point from the plurality of magnetic reference points. When a damage event is identified, a location of the damage event is determined by the control unit based on the acquired belt location.

14 Claims, 5 Drawing Sheets

U.S. PATENT DOCUMENTS

| | | | |
|---|---|---|---|
| 4,463,434 A | 7/1984 | Haylett et al. | 428/402.22 |
| 4,854,446 A * | 8/1989 | Strader | 198/810.02 |
| 5,847,563 A * | 12/1998 | Blum | 324/232 |
| 6,264,577 B1 * | 7/2001 | Hutchins | 198/810.02 |
| 6,291,991 B1 * | 9/2001 | Schnell | 198/810.02 |
| 6,352,149 B1 * | 3/2002 | Gartland | 198/810.02 |
| 6,715,602 B1 * | 4/2004 | Gartland | 198/810.02 |
| 7,494,004 B2 * | 2/2009 | Stolyar et al. | 198/810.02 |

* cited by examiner

SENSOR SYSTEM FOR A CONVEYOR BELT

CROSS-REFERENCE TO RELATED APPLICATIONS

This is a continuation application of U.S. patent application Ser. No. 12/185,400, filed on Aug. 4, 2008 (issued as U.S. Pat. No. 7,810,634). The teachings of U.S. patent application Ser. No. 12/185,400 are incorporated by reference herein in their entirety. This application is also related to application Ser. No. 11/269,786 to Wallace et al., entitled "Method for Self-Synchronizing a Conveyor Belt Sensor System" and filed on Nov. 8, 2005 (now issued as U.S. Pat. No. 7,740,128).

TECHNICAL FIELD

The invention relates to monitoring the condition of conveyor belts and, more particularly, to a sensor system for a conveyor belt for detecting and locating belt degradation and damage.

BACKGROUND

In a multitude of commercial applications, it is common to employ a heavy-duty conveyor belt for the purpose of transporting product and material. The conveyor belts so employed may be relatively long, for example, on the order of miles, and represent a high cost component of an industrial material handling operation. Such conveyor belts can possibly be as large as ten feet wide, and possibly as thick as three inches. The main belt material generally is a moderately flexible elastomeric or rubber-like material, and the belt is typically reinforced by a plurality of longitudinally extending metal cables or cords, which are positioned within the belt and extend along the length thereof. Such conveyor belts are often used to transport bulk material below and/or above ground, for example, in mining applications. The conveyor belts and respective drives are susceptible to normal wear and tear as well as damage from the material being transported and/or harsh environmental conditions. In the event the conveyor belt suffers catastrophic damage or otherwise becomes inoperable, the costs of repairing the conveyor belt, cleaning up the spilt material, and related downtime are substantial.

A problem associated with the use of the metal reinforcing cords is that with continued use of the conveyor belts, over time, the cords tend to deteriorate. For example, there may be a crack in the conveyor belt elastomeric material that permits water or possibly even an acid, resulting from water reacting with the conveyed material, for example, to contact one or more of the cords and potentially leading to corrosion of the cords. Cord damage may also result from an aggressive impact of the product or material being transported on the conveyor. Deterioration may also occur from natural wear or possibly fatigue of the metal due to long continued use. Occasionally, the damage to the cord is a total break, while in other instances the damage to the cord may be a partial deterioration that simply weakens the belt.

Because the cords are concealed inside the elastomeric material of the belt, it is challenging to detect any damage. Unfortunately, when the damage is sufficiently severe such that it becomes outwardly visible, a catastrophic failure of the belt may occur. More commonly, the damage may result in a condition that would make further use of the belt dangerous. For this reason, among others, it has generally been a practice in the industry to overdesign the belts by providing an adequately large margin of error which enables the belt to function reasonably safely even if the reinforcing cords are moderately damaged.

Accordingly, it has become common practice to monitor the condition of the conveyor belt. The objective of the monitoring is to identify damage to the reinforcing cords of the conveyor belt so as to reduce the likelihood of complete failure as well as to provide timely repairs and other prophylactic maintenance. Monitoring effectively increases the life or longevity of the belt. In this regard, one common practice is to have an annual or bi-annual analysis conducted on the conveyor belt. To this end, typically a separate entity (e.g., outside consultant), other than the owner or user of the conveyor belt, such as the manufacturer of the conveyor belt or some other third party, will come on site and set up a monitoring system in order to collect data on the conveyor belt during use. Data will generally be collected for multiple revolutions of the conveyor belt and may take several hours to complete. Once the data is collected, the outside consultant will leave the on-site location and take the data to another, remote location for analysis. The data will then be reviewed and a report generated providing details on the condition of the conveyor belt and any recommended maintenance. Depending on the consultant, the analysis and report may take anywhere from a few days to a few weeks to complete.

Continuous monitoring systems have been developed that collect data on the conveyor system to determine damage and possibly inspect, repair, or replace portions of conveyor belts. Although continuous monitoring is utilized, such systems suffer from similar deficiencies as those described above. In particular, the data is typically sent to a remote site for analysis and reporting to determine the location of damage; is complicated and prone to subjective interpretations; and lacks a clear standard on which to base instructions for finding events to inspect, repair, or replace portions of the conveyor belt. Even if the data is analyzed locally, after the analysis, locations of the identified damage may be difficult to locate along the belt. Generally, the only reference points available from the belt are splice locations, which may be from about 100 feet to in excess of about 1500 feet apart, if not further, making the determination of the location of the identified damage challenging. With belts having multiple intermediate splices, locating the reference points for the damage events can be even more challenging for the belt operator or maintenance personnel. Additionally the time it takes for conventional sensor systems to initiate a higher level of protection may be as long as one complete revolution of the belt for a reference marker or event to pass by the belt monitor sensors.

Accordingly, there is a need in the industry for an improved conveyor belt monitoring system that correlates sensor damage maps to physical belt markings in order to minimize the time required to initiate cord damage monitoring and quickly and accurately locate damaged areas of the conveyor belt.

SUMMARY OF THE INVENTION

Embodiments of the invention address these and other deficiencies in the art by providing a monitoring system for a moving conveyor belt having a plurality of embedded reinforcing cords and a plurality of identification tags. The monitoring system includes a tag reader for detecting and identifying the presence of an identification tag from among the plurality of identification tags passing by the tag reader, a belt monitor configured to detect a plurality of magnetic reference points, such as splices, and a damage event in the conveyor belt, and a control unit in communication with the belt monitor and the tag reader. The control unit is operable to assess the damage event as well as detect a location of the damage event on a portion of the belt relative to a splice from among the plurality of splices where each portion of the conveyor belt that is identified by a unique identification tag and in some configurations, unique cover branding.

In some embodiments, the conveyor belt of the system is composed of a pulley layer, a carcass layer, and a carry layer. The plurality of cords is disposed within the carcass layer, and the plurality of identification tags are disposed at spaced apart locations within the pulley layer. Alternately, the plurality of identification tags may be disposed at spaced apart locations within the carcass layer or other layer of the belt for belts having more than the three layers.

After a damage event has been detected, the control unit is further operable to determine a severity of the damage event. As such, the control unit is operable to additionally determine whether the damage event is a critical damage event or not. Thus, the system further comprises an alarm provided in response to identifying the damage event and a display to notify an operator of the monitoring system of recommended actions and the location of the damage event. If it is determined that the damage event is a critical damage event, messages may be displayed to notify an operator of the monitoring system of the location of the damage event.

In some embodiments, the belt monitor of the system may include a magnet to magnetize the at least one cord of the conveyor belt as the conveyor belt moves and a sensor array longitudinally spaced from the magnet. The sensor array is configured to measure a magnetic field of the at least one cord. Thus, the control unit may be further operable to identify the damage event based on the measured magnetic field of the at least one cord. In some embodiments, the damage event may be a break in the cord, while in other embodiments, the damage event may be wear of the at least one cord. In still other embodiments, damage events may include both conditions.

Embodiments of the invention further provide for a method of monitoring the moving conveyor belt. In these embodiments, the conveyor belt has a plurality of embedded reinforcing cords and a plurality of identification tags. The conveyor belt system may be of the type having a tag reader for detecting and identifying the presence of an identification tag from among the plurality of identification tags passing by the tag reader and a belt monitoring system to detect a plurality of splices. When monitoring the moving conveyor belt, a belt location is acquired on the moving conveyor belt from a belt map based on a splice from among the plurality of splices as well as a detected and identified identification tag. The cords of the conveyor belt are scanned using the belt monitoring system. Data from the scanned cords is analyzed to identify a damage event of at least one cord from among the plurality of cords in the conveyor belt, and, in response to identifying the damage event, a location of the damage event is determined based on the acquired belt location.

In some embodiments, the monitoring also determines a severity of the damage event in response to identifying the damage event. As such, when the damage event is not a critical damage event, the monitoring identifies whether the damage event has been previously detected and, in response to identifying that the damage event has been previously detected, determines whether the severity of the damage event has increased. The monitoring may further store a measure of an increase of the damage event in response to identifying that the severity of the damage event has increased. The monitoring may also further determine whether the damage event increase has exceeded a threshold severity value for the damage event in response to determining that the severity of the damage event has increased. In response to determining that the damage event increase exceeds the threshold, an alarm may be provided to notify the operator of the system of recommended actions and notify the operator of the location of the damage event. The recommended actions may include inspecting the conveyor belt, performing a major repair of conveyor belt, performing a minor repair of conveyor belt, performing a splice of conveyor belt, ignoring the damage event, or combinations thereof. When the damage event is a critical damage event, an alarm may be provided, the conveyor belt stopped, and the operator of the system notified of the location of the damage event.

Other embodiments of the invention also provide for a method of monitoring a moving conveyor belt. The conveyor belt has a plurality of embedded reinforcing cords and a plurality of identification tags. The conveyor belt system has a tag reader for detecting and identifying the presence of an identification tag from among the plurality of identification tags passing by the tag reader and a belt monitoring system to detect a plurality of splices. In these embodiments, associated time and distance target values are acquired from a calibration table for a next identification tag based upon a splice from among the plurality of splices as well as a detected and identified identification tag, which initiates time and distance counters associated with the time and distance target values. These time and distance target values may be reset by the identification of a splice. The cords of the conveyor belt are scanned using the belt monitoring system, and data from the scanned cords is analyzed to identify a damage event of at least one cord from among the plurality of cords in the conveyor belt. In response to identifying the damage event, a location of the damage event is determined based on the time and distance target values of the splice, the detected and identified identification tags, and the next identification tags.

In those embodiments, a severity of the damage event may also be determined in response to identifying the damage event. When the damage event is not a critical damage event, an identification may be made as to whether the damage event has been previously detected. In response to identifying that the damage event has been previously detected, a determination may be made as to whether the severity of the damage event has increased. An indication of the increase of the damage event may be stored in response to determining that the severity of the damage event has increased. If the damage event increase exceeds a threshold severity value for the damage event, an alarm may be provided notifying the operator of the system of recommended actions and notifying the operator of the location of the damage event. When the damage event is a critical damage event an alarm may be provided, the conveyor belt may be stopped, and an operator of monitoring system may additionally be notified of the location of the critical damage event.

Additionally, in some embodiments, a report may be generated that provides information on the conveyor belt, and this report may be printed on a printer. The printed reports may then be correlated to physical belt locations based on the information read from the identification tags. In other embodiments the printed reports may be generated at offsite locations and may be prepared by third parties.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general descrip

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Figure 1:
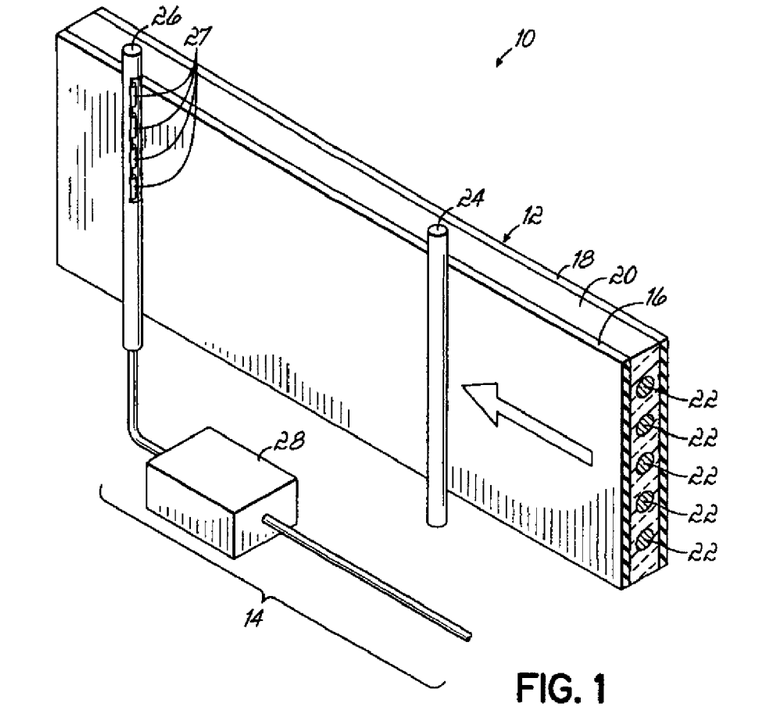
- FIG. 1 is a portion of a conveyor belt system consistent with embodiments of the invention.

Embodiments of the present invention include a monitoring system and methods to monitor a moving conveyor belt for cord damage, such as a complete fracture or partial damage of a cord. With reference to FIG. 1, an exemplary conveyor belt system 10 includes a conveyor belt 12 and a belt monitoring system, which is generally designated by 14. Contemporary conveyor belts are typically composed of multiple layers of material. For example, one embodiment of the conveyor belt (belt) 12 may contain layers such as a pulley layer 16, which is generally a moderately flexible rubber-like material that contacts rollers or other mechanisms that move the belt 12. Additionally, the belt 12 may also contain a carry layer 18, which also may be composed of moderately flexible rubber-like material. The carry layer 18 contacts the product or material being moved by the conveyor belt 12. In between the pulley layer 16 and carry layer 18 is a belt carcass 20. The carcass 20 generally includes a plurality of metal cords 22 longitudinally extending through a moderately flexible rubber-like material, providing additional strength to the conveyor belt 12. Other embodiments of the conveyor belt 12 may contain more or fewer layers than the exemplary belt illustrated in FIG. 1. Additionally, one skilled in the art will realize that the materials comprising the different layers of the belt may be the same, or more typically, different for each layer with their material characteristics chosen based on the function of the layer within the belt.

Figure 2A:
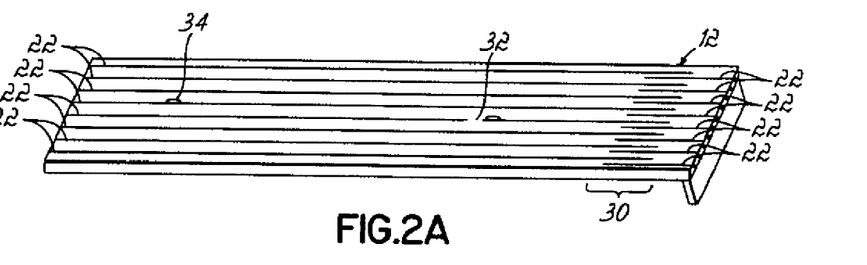
FIG. 2A is a representation of a portion of a conveyor belt in the conveyor belt system of FIG. 1 illustrating damage events.

Generally, monitoring the condition of the belts in the belt monitoring system 14 is accomplished by magnetizing the metal cords 22 with a magnet 24 and using a sensor 26 to detect damage in the cords 22. In various embodiments, the magnet 24 may be a permanent magnet or an electromagnet, while the sensor 26 may be a sensor array that includes a plurality of magnetic field sensors 27. Damage events in the cords 22 are indicated as a magnetic pole (north or south), which is detected by the sensor 26. The sensor 26 may then transmit data to a data acquisition unit 28, which may further send the data to a control unit. FIG. 2A illustrates a portion of the belt 12 of FIG. 1 with cords 22 exposed. Commercially available conveyor belts are generally constructed from a number of sections, typically of the order of about 500 feet to in excess of about 1500 feet in length, which are spliced 30 together to form a continuous belt 12. In addition, damaged sections of the belt 12 are often repaired by cutting out the damaged portion and splicing 30 in a new portion. Additionally illustrated are damage events 32 and 34.

Figure 2B:
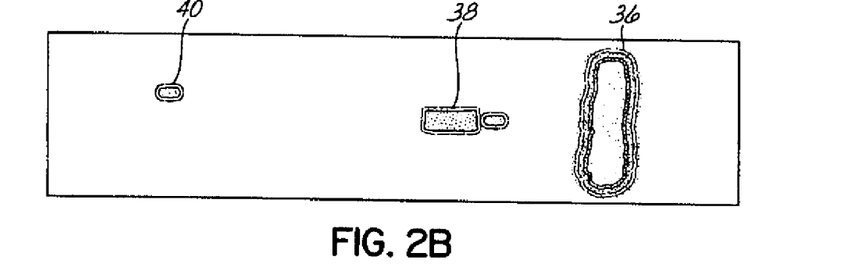
FIG. 2B is an exemplary output of magnetic properties of the damage events in FIG. 2A.

FIG. 2B shows an exemplary output of magnetic properties of cords 22 and damage events 32, 34 from the belt monitoring system. The damage events 32, 34, in specific embodiments, may be partial damage of a cord or a fracture in a cord, respectively. In some embodiments, partial damage may include wear of the cord. As seen in FIG. 2B, the splice 30 in the belt 12 produces a peak 36 in output from sensor 26. Thus the "conveyor belt signature" output representation of FIG. 2B includes three peaks 36, 38 and 40, which indicate a splice in the belt as well as indicate the condition of the reinforcing cords 22 within the belt. Because the peaks 36 of FIG. 2B have a substantially uniform amplitude, this is indicative of a uniform overlap of the steel cords 22 within the splice 30 causing the reluctance of the conveyor belt 12 to be substantially constant for the length of the splice 30. Contemporary monitoring systems use this type of an indication to identify splices 30 within the conveyor belt 12. In some systems that use a DC magnetic generator, a non-uniform fringing field structure is measured above both the splices 30 (identified by the output pattern 36) and the damage events 32, 34 (also identified by the output patterns 38, 40).

Detection of the magnetic properties of cords and damage events typically includes detecting the magnetic fields of the belt 12, and particularly the magnetic field of the steel cords 22 induced by the magnet 24 and detected by the sensor 26. In one representative embodiment, the magnet 24 generates magnetic flux on the cords 22 through an alternating current and coils, while the sensor 26, which may include at least one Hall-effect sensor, is operable to detect the magnetic flux induced of the cords 22. Abnormalities in the magnetic flux of the cords 22 indicate magnetic poles, which may indicate damage events or splices. Thus, the data acquisition unit 28 is operable to receive data from the sensor 26 to determine whether there is an abnormality in the magnetic flux of the cords 22 that may indicate damage events 32, 34 or splices 30.

In alternative embodiments, the magnet 24 may include any type of magnet that is operable to generate a magnetic flux on the cords 22 other than that alternating current electromagnet described above. Furthermore, in alternative embodiments, the system 10 may include more than one magnet 24, with each magnet having different operating characteristics. Additionally, in alternative embodiments, the sensor 26 may include at least one magnetometer that is operable to detect magnetic flux of the cords 22 other than the Hall-effect sensor disclosed above. For example, the sensor 26 may include at least one fluxgate magnetometer, at least one Teslameter, at least one gaussmeter, at least one other magnetometer, and/or combinations thereof to detect the magnetic flux of the cords 22.

Although one type of output of the magnetic properties of the cords 22 and damage events 32, 34 from a belt monitoring system 14 is shown in FIG. 2B, one having ordinary skill in the art will appreciate that alternative outputs may be used without departing from the scope of the invention. For example, alternative outputs to determine the magnetic properties of the cords 22 and damage events 32, 34 of a belt 12 may include illustrations of waveforms of the detected magnetic flux of the cords 22 and the analysis thereof.

Figure 3:
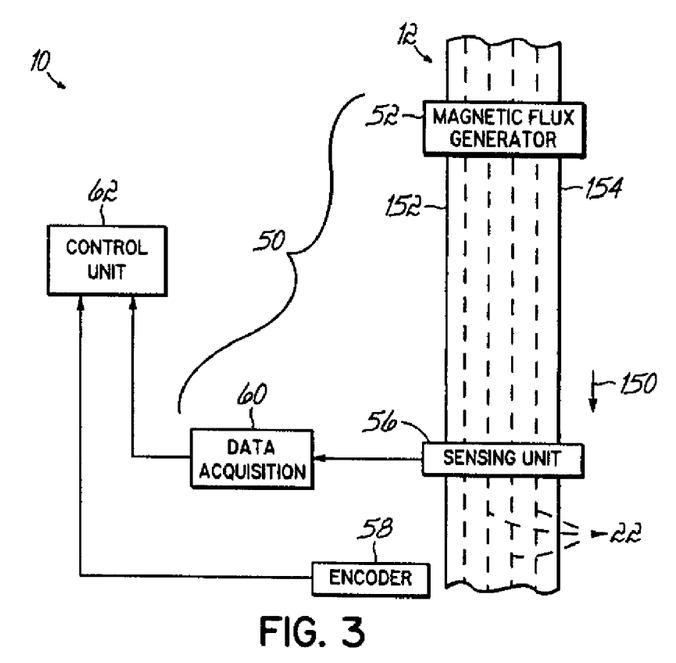
FIG. 3 is a diagrammatic representation of a specific embodiment of a belt monitoring system for the conveyor belt system of FIG. 1.

In a specific embodiment of the conveyor belt system 10 illustrated in FIG. 3, a belt monitoring system 50 may be permanently coupled to the conveyor belt system 10 so as to provide a continuous monitoring capability of the conveyor belt 12. Alternatively, the belt monitoring system 50 may be configured to operatively couple to the conveyor belt system 10 so as to provide periodic monitoring of the conveyor belt 12. Exemplary belt monitoring systems that use magnetic detection have been disclosed in U.S. Pat. Nos. 4,864,233, 4,439,731, 5,570,017, and 5,847,563, the disclosures of which are hereby incorporated by reference in their entireties. These systems use generated magnetic fields to magnetize the cords within the conveyor belts and then look for anomalies in the magnetized cords to identify wear and damage to the cords in the belt. PCT Publication No. WO97/05047, the disclosure of which is also hereby incorporated by reference in its entirety, also discloses using magnetic fields and magnetizing cords to detect damage events. This particular monitoring system 50, which uses metal cords positioned at oblique angles across the belt for rip detection, may be adapted to monitor the steel cords within the belt itself. The magnetic flux generator 52 magnetizes the cords 22 in the belt similar to magnetizing the cords disclosed in the publication. A sensing unit 56 senses flux leakages, which are recorded in the data acquisition unit 60 and supplied to a control unit 62 for processing. An encoder 58 may also be employed supplying the control unit 62 with belt speed information so that any detected damage events may be properly located along the conveyor belt 12 from the last detected splice.

An alternative system has been developed by Advanced Imaging Technologies of Durban, South Africa. Generally, in this system the belt monitoring system includes a DC magnetic field generator, an AC magnetic field generator, a magnetic field-sensing unit, an encoder for determining the speed of travel of the conveyor belt 12, and a data acquisition system for processing signals received from the field-sensing unit and for supplying data to a control unit.

Figure 4:
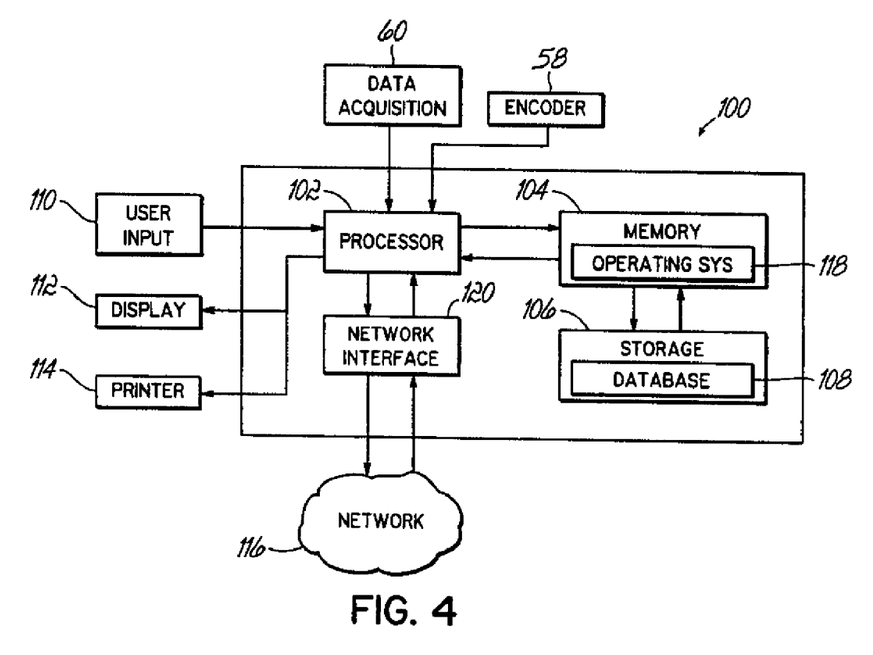
FIG. 4 is a block diagram of an exemplary hardware and software environment for a computer suitable for interfacing with the belt monitoring system in FIG. 3.

In an exemplary embodiment, the control unit 62 may be a computer 100. As schematically illustrated in FIG. 4, computer 100 typically includes at least one processor 102, which may be coupled to data acquisition system 60 and encoder 58, among other devices, and further coupled to a memory 104. Processor 102 may represent one or more processors (e.g. microprocessors), and memory 104 may represent the random access memory (RAM) devices comprising the main storage of computer 100, as well as any supplemental levels of memory, e.g., cache memories, non-volatile or backup memories (e.g. programmable or flash memories), read-only memories, etc. In addition, memory 104 may be considered to include memory storage physically located elsewhere in computer 100, e.g., any cache memory in a processor 102, as well as any storage capacity used as a virtual memory, e.g., as stored on a mass storage device 106. The mass storage device 106 may contain a cache or other data storage, which may include one or more databases 108.

Computer 100 also typically receives a number of inputs and outputs for communicating information externally. For interfacing with a user or operator, computer 100 typically includes one or more user input devices 110 (e.g., a keyboard, a mouse, a trackball, a joystick, a touchpad, a keypad, a stylus, and/or a microphone, among others). Computer 100 may also include a display 112 (e.g., a CRT monitor, an LCD display panel, and/or a speaker, among others) or other output device, such as a printer 114. The interface to computer 100 may also be through an external terminal connected directly or remotely to computer 100, or through another computer communicating with computer 100 via a network 116, modem, or other type of communications device.

Computer 100 operates under the control of an operating system 118 and executes or otherwise relies upon various computer software applications, components, programs, objects, modules, data structures, etc. Computer 100 communicates on the network 116 through a network interface 120. In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention.

In some embodiments of the invention, the belt monitoring system 14 may provide an on-demand reporting feature that generates a report providing information on the conveyor belt 12, its condition, and recommended action items for the belt operator. Alternatively belt data may sent off site to be analyzed and a report generated providing detailed information about the cord damage with the belt and its location. In reference to FIG. 4, the instructions for generating a report may be received locally, such as with input devices 110 of computer 100. Alternatively, the instructions may be received remotely, such as from another computer that is operatively coupled to computer 100 through network 116, for example. The report may be output in a number of formats in accordance with the invention. By way of example, the report may be output to display 112 or printer 114 of computer 100. Alternatively or additionally, the report may be provided in various formats (e.g., pdf, html, and other known formats) and sent over the network 116 (e.g., email, internet, short message service, such as texting, and/or other known programs, protocols, etc. for transmitting data) to a remote location. In any event, the report provides information on the conveyor belt 12 that allows the user to make timely maintenance decisions that reduce the likelihood of catastrophic events and extend the life of the conveyor belt 12. As noted above, the reporting feature is on-demand and, thus, may be generated at any time. For example, an operator may use the user input 110 (e.g., keyboard) to have the belt monitoring system 14 print the report on printer 114. Thus in this example, the report is provided on site to conveyor belt 12 and at any time desired by the operator.

The direction of travel of the conveyor belt 12 is indicated by arrow 150 in FIG. 3. The magnetic flux generator 52 and the field-sensing unit 56 extend across the conveyor belt 12 and are spaced therefrom (e.g., suspended above the belt 12) by a relatively short distance (e.g., about 4-5 cm). The encoder 58 is operatively coupled to a pulley of the conveyor system 10 to monitor the speed of travel of the conveyor belt 12. The magnetic flux generator 52 and the field-sensing unit 56 may extend beyond the sides 152, 154 of the conveyor belt 12. It will be appreciated that the direction of travel 150 defines a longitudinal direction, with a transverse direction being defined across the conveyor belt and a perpendicular direction being defined perpendicular to the conveyor belt 12.

Typical conveyor belts have a cord spacing of about 10 mm to about 25 mm. Those of ordinary skill in the art will appreciate that the number of cords 22 in conveyor belt 12 will depend on the spacing of the cords 22 and the width of the conveyor belt 12. Although only four such cords 22 are shown in FIG. 3, it should be recognized that more or fewer cords 22 may be used depending on the specific application. For example, the size, spacing, and number of cords 22 determine to a large extent the properties of the conveyor belt 12, including strength. Those of ordinary skill in the art will recognize how to select the proper conveyor belt parameters to meet the requirements of a specific application.

In use, during operation of the conveyor belt 12, a magnetic flux is generated by the magnetic flux generator 52, which magnetizes the cords 22 along their entire lengths. Sensors of the field-sensing unit 56 sense the magnetic fields. Signals provided by the field-sensing units 56 are received by data acquisition system 60 and processed by computer 100. The data generated by this monitoring may be analyzed on site and the results stored in memory 104 of computer 100. The results of the real-time, on-site analysis, similar to the generic results illustrated in FIG. 2B, may be provided to the operator in a report or on a computer display 112 indicating the condition of the conveyor belt 12 and potentially recommend action items directed to extending the life of conveyor belt 12.

Even as sensor technology improves for detecting damage events within the cords of conveyor belts, in some conventional belt monitoring systems the references available for locating the damage events are splices 30 within the belt 12. In other conventional belt monitoring systems, additional magnets may be placed in the belt 12 as reference points. Alternatively, proximity sensors, encoders, and/or other positional devices may also be placed in the belt 12 as reference points. Each of these may supply a localized reference point to use as references in locating the damage events. However, and as disclosed above, belts are composed of multiple sections, making it challenging to locate a damage event without knowing the section. Furthermore, when damaged belts are repaired, one method of repairing the belt 12, as disclosed above, is to remove the damaged section and add a new belt section, which introduces additional sections and splices 30. Without being able to identify a particular splice in a particular section in relation to another splice, the inherently non-uniform splice pattern may also introduce additional challenges in locating a damage event when only using splices as references.

Figure 5:
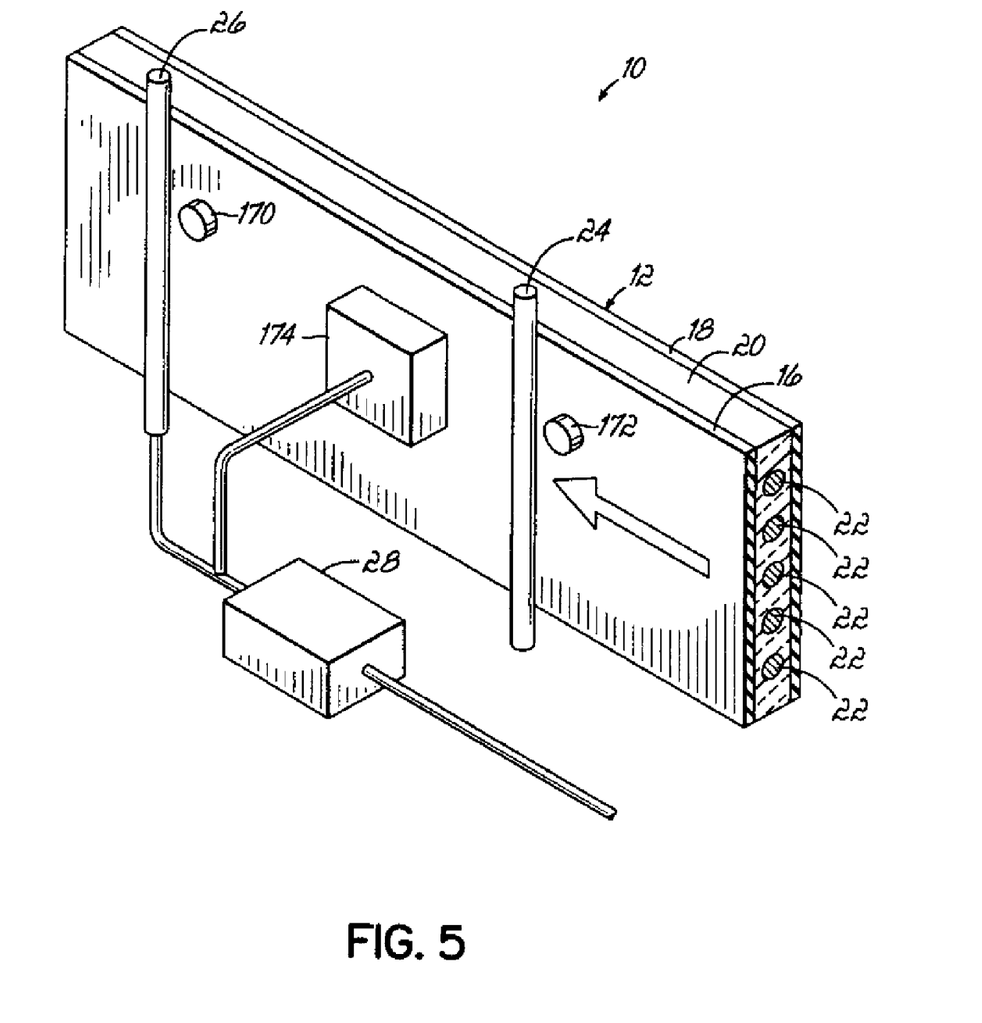
FIG. 5 is a portion of the conveyor belt system of FIG. 1 incorporating identification tags.

To assist in alleviating this condition, and as seen in FIG. 5, a plurality of identification tags 170, 172 (two being shown in the portion of the belt system in FIG. 5) may be placed longitudinally along the belt 12 at known locations, which may be stored in a belt map in the storage 108 of computer 100. The identification tags 170, 172 may provide additional identification information between splice locations along the belt 12. Some embodiments may also place identification tags at splice locations in order to uniquely identify the splices themselves. The identification tags 170, 172 are detected and identified by a tag reader 174. In some embodiments, the tag reader 174 may be connected to the data collection device 28 along with the sensor 26, and the identification data may then be sent from the data collection device 28 to the computer 100. The identification tags 170, 172 may be incorporated into the belt construction, for example placed between the pulley layer 16 and the carcass 20. In other embodiments, the identification tags may be placed between other layers or incorporated into a specific layer of the belt 12.

In some embodiments, each identification tag 170, 172 may be an RFID tag. Generally, RFID tags contain at least two parts. One part is an integrated circuit for storing and processing information, modulating and demodulating a (RF) signal, and other specialized functions. Another part is an antenna for receiving and transmitting the signal. In some embodiments, each identification tag 170 and 172 may be configured to receive, store, and transmit information about the belt, including a unique identification of the identification tag 170, 172, an identification of the belt section in which each identification tag 170 and 172 is disposed, an identification of the service history of a belt section, and information related to a manufacturing history of the belt section including belt 12 construction information, an estimated service life of the belt, a date the belt was manufactured, a recommended load limit for the belt, among others.

Some RFID tags have a passive configuration, which has no internal power supply. Instead, a minute electrical current induced in the antenna by the incoming radio frequency signal generated by the reader 174 provides just enough power for the integrated circuit in the tag 170, 172 to power up and perform an action, such as store data such as that discloses above, transmit a response, or both. Most passive tags signal by backscattering the carrier wave from the reader 174. This means that the antenna has to be designed both to collect power from the incoming signal and also to transmit the outbound backscatter signal. As such, the response of a passive RFID tag is not necessarily just an ID number; the tag chip may also contain non-volatile, writable memory for storing data such as the belt information above. RFID tags used with embodiments of the invention are generally designed to store an identification of belt sections in which they are disposed, which may then be read and compared to a belt map to determine a belt location. Thus, one skilled in the art will realize that the identification tags 170, 172 may be used to store belt condition data, which may additionally be written to the tags with an addition of a tag writer, which may be configured with, or as part of, the tag reader 174.

Figure 6:
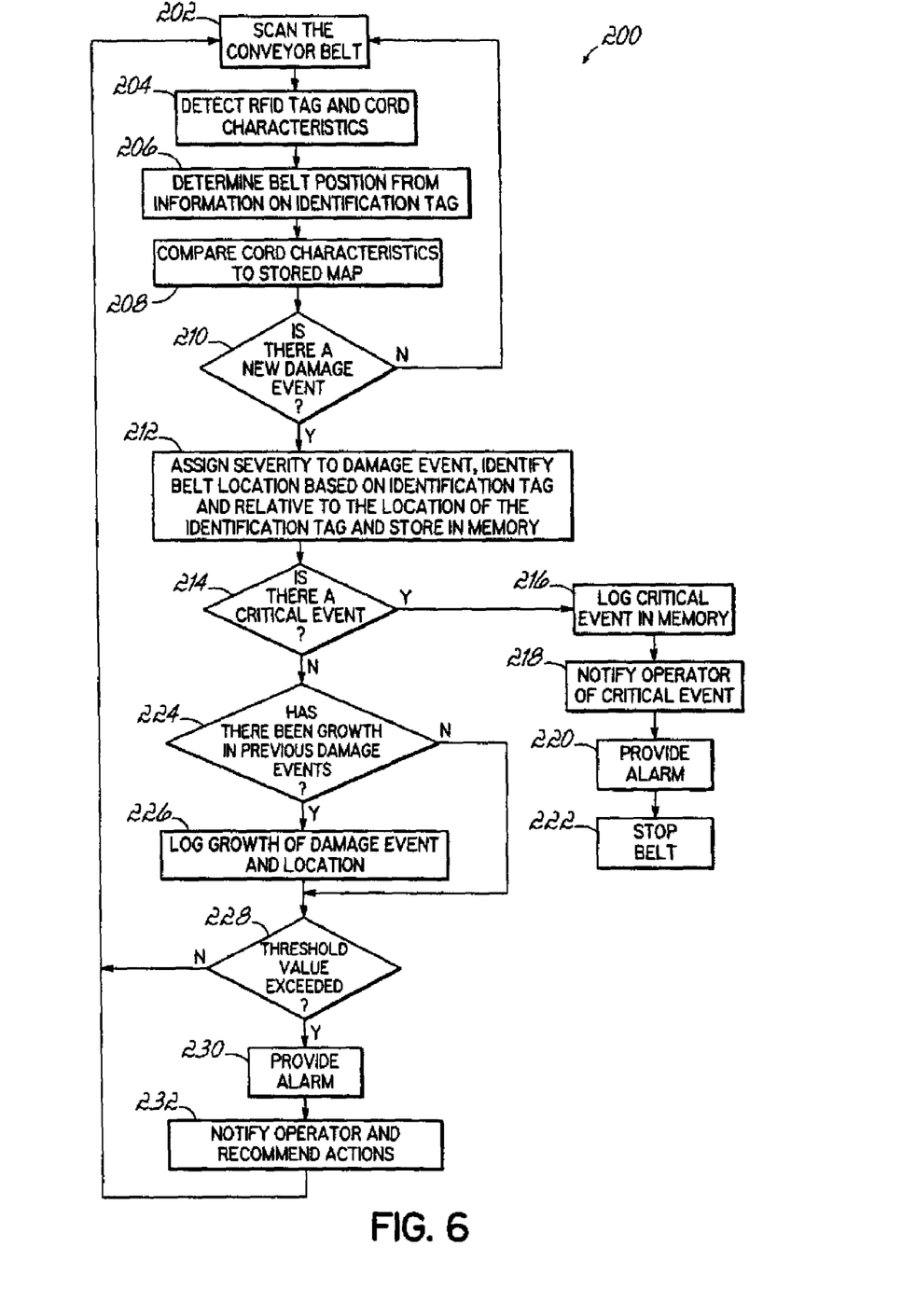
FIG. 6 is a flowchart illustrating a process of monitoring the conveyor belt system of FIG. 5.

Flowchart 200 in FIG. 6 illustrates a method for an embodiment of the invention to monitor a conveyor belt system. As the conveyor belt is moving, the belt monitor and tag reader scan the conveyor belt for damage events, splices, and identification tags (block 202). Sensors in the belt monitor detect cord characteristics from the scans and identify splices, while the tag reader reads belt section identification data from the identification tag as the tags sequentially pass by the tag reader (block 204). A belt map may be referenced using the splice locations and the belt section identification data from the identification tag to determine a position on the belt (block 206). Additionally, cord characteristics are compared to a stored map (block 206), which may contain data related to cord wear or previous damage events. The belt position data may be stored along with the cord wear or previous damage events to assist in tracking the condition of the belt in some embodiments.

If no damage is found from the scan by the belt monitor ("No" branch of decision block 210), the scanning continues at block 202. If however, a new damage event is found ("Yes" branch of decision block 210), a determination is made as to the severity of the damage event and a location of the damage event based on the identifier. The severity of the detected damage event and the belt location of the damage event as based on the identification tag and the location relative to the identification tag is stored in memory, such as in the map (block 212). If it is determined that the damage event is a critical event ("Yes" branch of decision block 214), the critical event may be logged in memory (block 216). An operator of the belt may be notified of the critical event (block 218) by displaying a message or other notification. An alarm may also be provided (block 220) and the belt may be stopped (block 222) to avoid any further damage or unsafe operating conditions.

If it is determined that the damage event is not critical ("No" branch of decision block 214), a determination is made to see if the damage event is a result of growth in a previous damage event. If the damage event is a result of growth of a previous event ("Yes" branch of decision block 224), the growth of the damage event and the location determined from the identification tag are logged the map or other locations (block 226). After logging the event, or if no growth was determined ("No" branch of decision block 224), the damage event is compared to a threshold. If the damage event exceeds the threshold value ("Yes" branch of decision block 228), an alarm may be provided (block 230). An operator of the belt system may be notified of the event and may additionally be supplied with recommended actions (block 232) depending on the severity of the damage event. After notification or if the threshold value was not exceeded ("No" branch of decision block 228 or after block 232), scanning of the belt and the identification tags continues at block 202.

Figure 7:
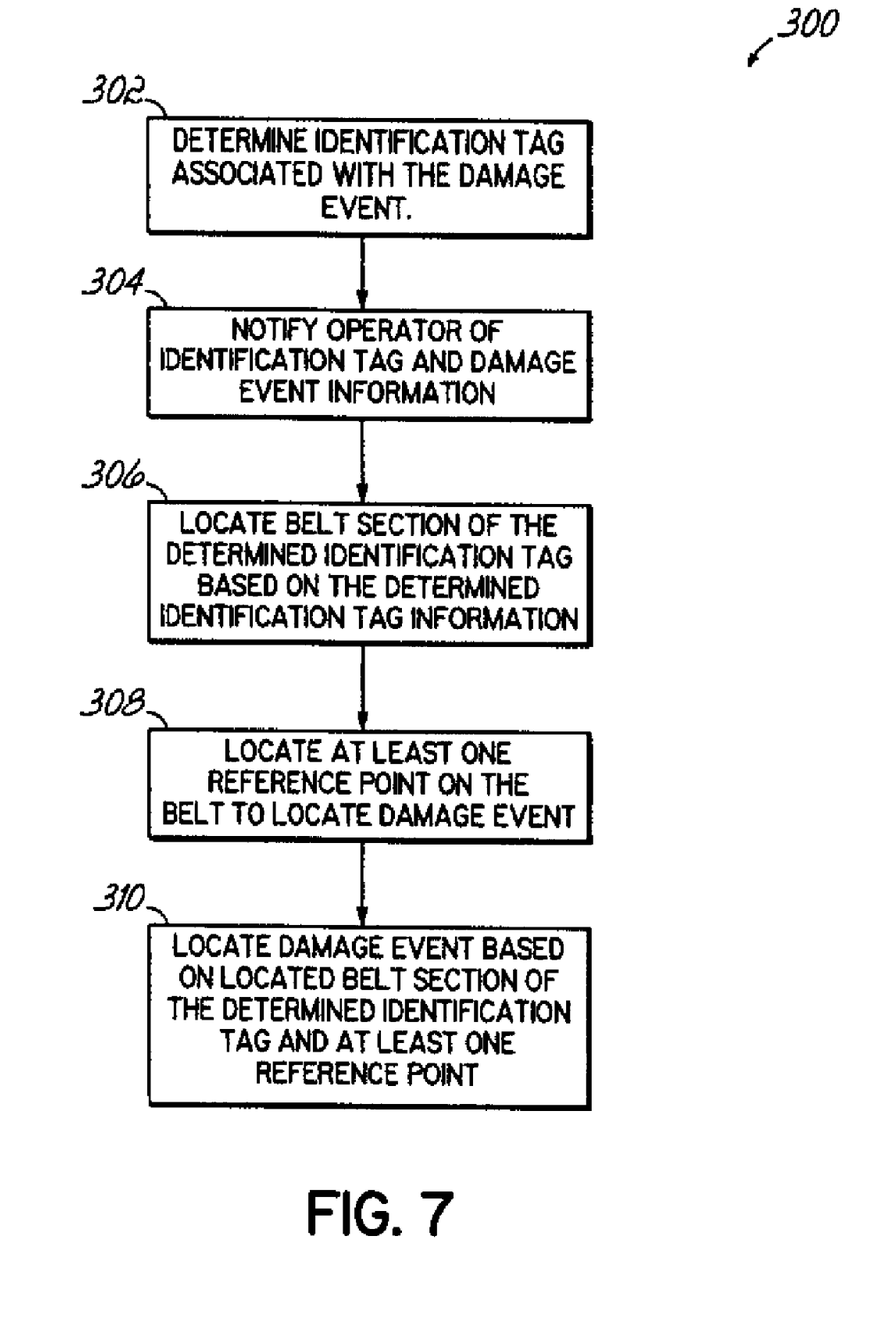
FIG. 7 is a flowchart illustrating an alternative method for an embodiment of the invention to locate critical events on the conveyor belt system of FIG. 5.

Flowchart 300 in FIG. 7 illustrates a method for an embodiment of the invention to physically locate damage events of a conveyor belt, such as complete fractures or partial damage of a cord of the conveyor belt. As previously indicated, the belt monitor and tag reader scan the conveyor belt for damage events, splices, and identification tags as the conveyor belt is moving past the sensors. After determining that a damage event has occurred, an identification tag associated with the damage event is determined (block 302). In some embodiments, the identification tag on the same belt section as the damage event is determined as the identification tag associated with the damage event. In other embodiments where each belt section may not have an identification tag, the identification tag associated with the damage event may be located on an adjacent or nearby belt section. Thus, the damage event location may be determined with reference to the belt map. The operator is notified of the determined identification tag and other damage event information, including at least one reference point, to locate the damage event (block 304). In some embodiments, the operator may be notified of the determined identification tag and other damage event information in connection with determining the damage event (block 218 of FIG. 6). In other embodiments, the operator may be notified of the determined identification tag and other damage event information in connection with a report generated either in real time or after an analysis by a third party, either on site or at an off site location.

As disclosed above, one having ordinary skill in the art will appreciate that the damage event may occur on a belt section that is not configured with an identification tag. As such, the operator of the belt system may be notified of the damage event as well as the closest belt section to that damage event configured with an identification tag. The operator may further be notified of other damage event information, such as the belt section of the damage event, e.g. how many belt sections away the damage event is located, and at least one reference point on the belt to find the damage event. Reference points may include areas of the belt section that produce unique magnetic signatures such as splices, embedded permanent magnets, other types of identifiers having unique magnetic signatures, or other types of identifiers on the belt itself, such as unique visual markings. These reference points may be determined from the belt map, and thus the damage event may be provided to the operator or technician and act as a blueprint to physically locate the damage event from the at least one reference point and the identification tag.

The identification tags may include information in addition to the unique identification number that may help in locating the belt section. For example the identification tags may also include a manufacturer, a date of manufacture, a brand name, or other identifying information. The operator may then be notified of these identifiers to locate the belt section of the determined identification tag. In some embodiments the operator or technician may use a handheld identification tag reader to read the identification tags in the belt in order to locate the belt section with the identification tag. Thus, the operator or technician may locate the belt section of the determined identification tag based on the determined identification tag information (block 306). As disclosed above, the operator or technician may receive at least one reference point, such as manufacturer or brand information, that may be indicated on the belt and use that reference point to locate the belt section with the damage event. Alternatively the belt may be marked with a unique identifier, such as a serial number, a specific set of marking, and/or other unique visual identifiers, and the operator or technician may locate the belt section by the visual identifier reference points. Once the belt section has been located, the operator or technician may locate at least one reference point on the belt section (block 308). The reference point may generally be included with the damage event information and provided with the identification tag information to determine the physical location of the damage event on the identified belt section (block 310).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A monitoring system for a moving conveyor belt having a plurality of embedded reinforcing cords and a plurality of identification tags spaced along a length of the conveyor belt, the system comprising:
    a tag reader for detecting and identifying the presence of an identification tag from among the plurality of identification tags passing by the tag reader, wherein the identification tags include (a) an antenna for receiving and transmitting a signal and (b) an integrated circuit;
    a belt monitor configured to detect a plurality of magnetic reference points and a damage event in the conveyor belt; and
    a control unit in communication with the belt monitor and the tag reader, the control unit operable to assess the damage event as well as detect a location of the damage event relative to a magnetic reference point from among the plurality of magnetic reference points and based on the detected and identified identification tag and wherein the control unit is further operable to determine severity of the damage event.

2. The monitoring system of claim 1, wherein the conveyor belt includes a pulley layer, a carcass layer, and a carry layer, the plurality of cords are disposed within the carcass layer, and the plurality of identification tags are embedded within the conveyor belt.

3. The monitoring system of claim 1, wherein the magnetic reference point from among the plurality of magnetic reference points is a splice from among a plurality of splices.

4. The monitoring system of claim 1 wherein the control unit is further operable to determine that the damage event is not a critical damage event, and the system further comprises:
- an alarm provided in response to identifying the damage event; and
- an display to notify an operator of the monitoring system of recommended actions and the location of the damage event.

5. The monitoring system of claim 1, wherein the control unit is further operable to identify that the damage event is a critical damage event and, in response, immobilize the movement of the conveyor belt, and the system further comprises:
- an alarm provided in response to identifying that the damage event is a critical damage event; and
- an display to notify an operator of the system of the location of the damage event.

6. The monitoring system of claim 1, wherein the belt monitor includes a magnet to magnetize the at least one cord of the conveyor belt as the conveyor belt moves and a sensor array longitudinally spaced from the magnet and configured to measure a magnetic field of the at least one cord, and wherein the control unit is further operable to identify the damage event based on the measured magnetic field of the at least one cord.

7. The monitoring system of claim 1, wherein the damage event is a break in the at least one cord.

8. The monitoring system of claim 1, wherein the damage event is a partial damage of the at least one cord.

9. The monitoring system of claim 1 wherein the tag reader generates a radio frequency signal.

10. The monitoring system of claim 1 wherein the radio frequency signal generated by the tag reader provides enough power for the integrated circuit in the tag to power up and transmit a response.

11. The monitoring system of claim 9 wherein the radio frequency signal generated by the tag reader includes a carrier wave.

12. The monitoring system of claim 11 wherein the antenna collects power from the incoming carrier wave and transmits an outbound backscatter signal.

13. The monitoring system of claim 9 wherein the integrated circuit stores and processes information.

14. The monitoring system of claim 13 wherein the integrated circuit modulates and demodulates the radio frequency signal.

\* \* \* \* \*